Sept. 27, 1949.   H. E. BRAEG   2,483,034
ANATOMICAL INSTRUCTION DEVICE
Filed Jan. 4, 1949   3 Sheets-Sheet 1
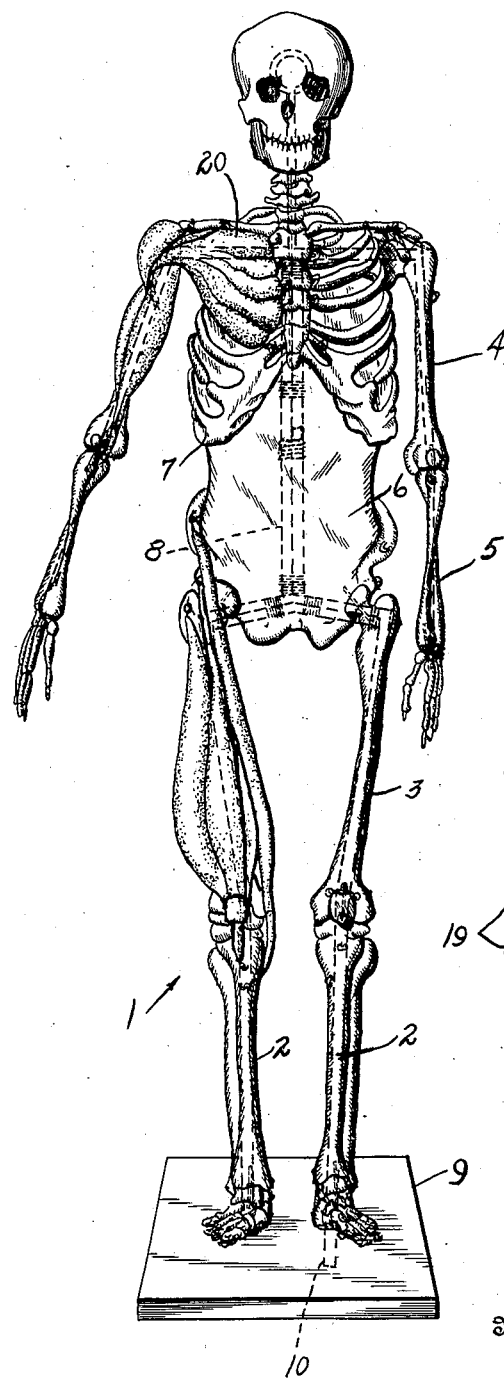
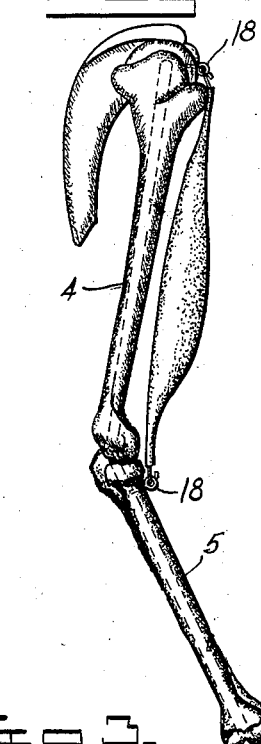
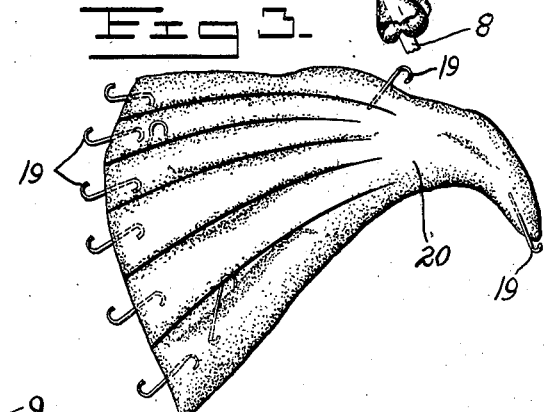

Inventor
Herman Emanuel Braeg
By Albert H. Kirchner

Sept. 27, 1949. H. E. BRAEG 2,483,034
ANATOMICAL INSTRUCTION DEVICE
Filed Jan. 4, 1949 3 Sheets-Sheet 3

Inventor
Herman Emanuel Braeg
By Albert H. Kirchner

Patented Sept. 27, 1949

2,483,034

UNITED STATES PATENT OFFICE 2,483,034

ANATOMICAL INSTRUCTION DEVICE

Herman Emanuel Braeg, St. Mary's College, Calif.

Application January 4, 1949, Serial No. 69,203

2 Claims. (Cl. 35—17)

The present invention relates to educational devices, and more particularly to an article of manufacture useful in the teaching and study of anatomy, including the bones of a human or other animal skeleton and more especially the appearance and location of the muscles and their relationship to the bones and to each other.

Important objects of the invention include providing an article of the class indicated which will be relatively inexpensive to manufacture and which will be durable and efficient in use in the teaching and study of artistic anatomy principally and to some extent also in the teaching and study of medical anatomy.

An important object of the invention is to provide an instrumentality useful in the study and teaching of anatomy both medical and artistic, which will be capable of being reused an indefinite number of times, which will graphically and vividly disclose the shape, location and function of the muscles and bone structures to an extent not obtainable by the use of prior art replicas, charts, pictorial representations and the like.

Reduced to practice in the field of human anatomy, the invention is intended fully to serve the needs of art students who must learn the arrangement and appearance of the principal outer muscles of the human body, and it can be used by medical students also in preliminary, introductory instruction preparatory and supplemental to more detailed study involving actual dissection of cadavers.

An important feature of the invention is the use of three-dimensional structural material, including a skeleton base and muscle shapes simulating accurately the shapes and relative sizes of the actual muscles made attachable to and detachable from the skeleton so that the instructor and student may disconnect the structure and replace the parts as often as may be necessary to acquire thorough knowledge of the appearance, location, relationship, and to some extent the function also, of the various muscles.

A preferred form of the embodiment of the invention which has been reduced to practice and found entirely satisfactory, and which is therefore at present preferred by me, is shown in the accompanying drawings in which Figure 1 is a front plan view of a skeleton model with certain of the muscle models shown attached thereto;

Fig. 2 is a detail of an arm bone with certain of the muscles attached thereto;

Fig. 3 is an elevational view of a pectoral muscle;

Figure 7:
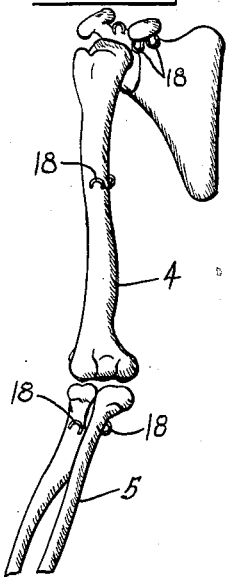
Figure 8:
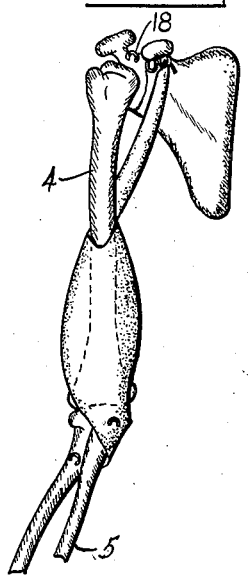
Figure 9:
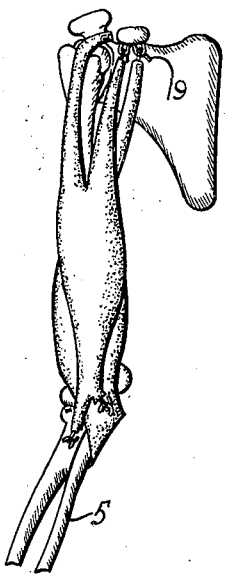
Figure 10:
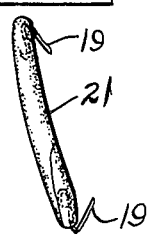
Figure 11:
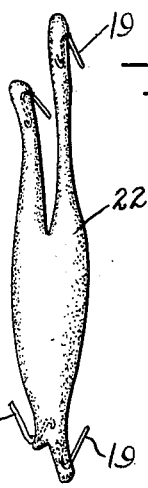
Figure 12:
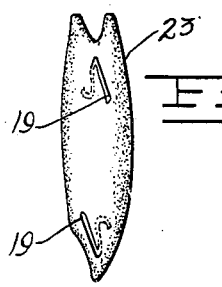

Figs. 7, 8 and 9 are front elevational views showing the arm and shoulder bones and illustrating the various stages by which the muscles are attached thereto; and Figs. 10, 11 and 12 are elevational views of the muscles shown applied in Figs. 8 and 9.

Generally speaking, the invention comprises providing a skeleton model hereinafter called simply a skeleton, and a series of muscle models, hereinafter called simply muscles, all made in three-dimensional form and provided with connecting means by which the muscles may be attached to and detached from the skeleton or the other muscles in accordance with their location in the living body. The skeleton is made of adequately hard, solid material, simulating true bone structure, with the individual bone models, hereinafter called simply bones; more or less articulated to each other so that the bones may be moved in realistic fashion about the joints, and the muscles are made of flexible, elastic material simulating those qualities in true muscle tissue, so as to give the student an accurate impression of actual muscle shape, texture and other properties when handled on or off the skeleton, and so as to simulate actual muscular action when the bones of the skeleton are moved about their joints with the muscles attached.

The illustrated embodiment depicts a human skeleton and muscular system because this subject may be regarded as probably the most important and most widely used in the study of anatomy generally, but it will be obvious that the principles of the invention are capable of being embodied also in other animal species.

Referring to the drawings, Fig. 1 shows a human skeleton, designated generally 1, comprising, among other parts, lower leg bones 2, thigh bones 3, upper arm bones 4, lower arm bones 5, and a solid, integral trunk member 6, including ribs 7, to which trunk member the upper ends of the leg and arm bones are attached by connections that preferably are articulated for relative movement, with similar joints preferably provided at the knees and elbows of the leg and arm bones, respectively.

Figure 6:
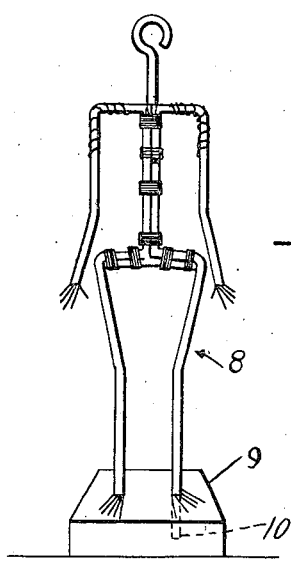
Fig. 6 is a front elevational view of a basic armature used in building the skeleton.

This skeleton 1 is made by molding or otherwise fashioning individual replicas of the respective bones about appropriate foundation members. Fig. 6 shows an armature which may be used as a general foundation member to produce skeletons of limited joint movement. This armature, designated generally 8, is best made of some relatively pliable tube or rod stock, such as lead or a lead alloy which is capable of being bent a large number of times without breaking and, as is evident from Fig. 6 and from the showing in Fig. 1, consists of rod or equivalent structures bent and shaped to the general form and relationship of the members and trunk of the skeleton, with the rods or the like bound together along the backbone region and in the pelvis area to give increased strength and rigidity to these parts.

The bones are built on the armature by fashioning them of any suitable plastic substance which can be modeled, cast or otherwise properly shaped and will set to a hardness simulating that of actual bone. Numerous readily available plastics are suitable for this purpose and the invention is not limited to the use of any particular substance. I have used with success the product which is disclosed in U. S. Patent No. 1,838,618, issued to Griffiths on December 29, 1931, entitled "Plastic composition," and comprising the combination of a solution of nitrocellulose, a resinous body and a non-drying oil in a ketonic liquor to which finely ground wood flour or china clay is added as a filler. This material is a well known article of commerce in the form widely distributed by Boyle-Midway, Inc., of Jersey City, New Jersey, under the registered trade-mark "Plastic Wood."

Figure 4:
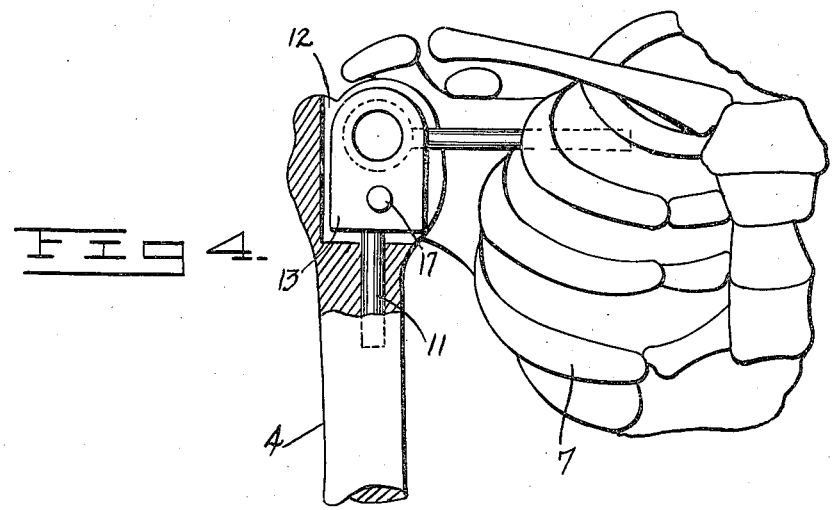
Fig. 4 is a front elevational view of a shoulder joint, shown partly in section.
Figure 5:
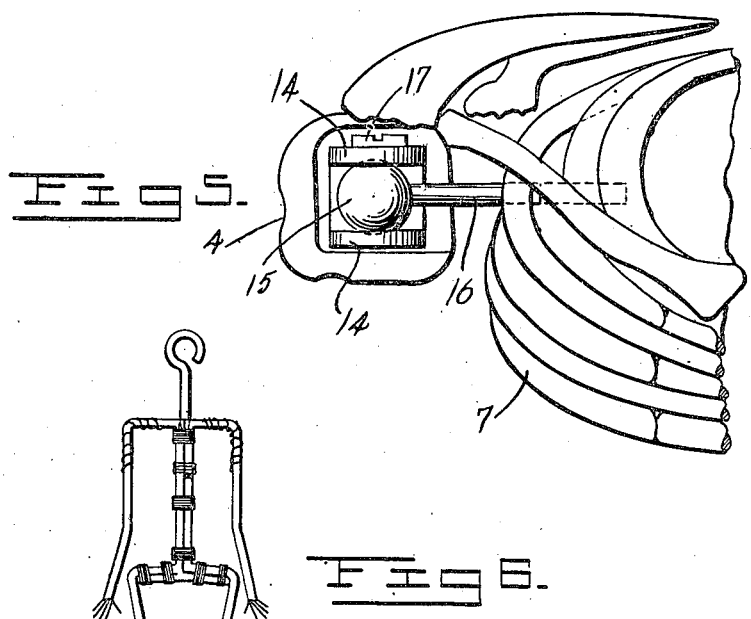
Fig. 5 is a top plan view of the structure shown in Fig. 4.

Fig. 1 shows a skeleton built upon the unitary armature 8 of Fig. 6, mounted on a pedestal 9 and firmly secured thereto by anchoring a stiffened, downward projection of one of the leg bone bases in the pedestal, as shown at 10. This skeleton is capable of limited movement in its principal joints. If unlimited movement is desired, the skeleton is made as shown in Figs. 4 and 5, with ball and socket or analogous joints connecting the bones of the legs and arms at their ends to each other and to the trunk 6. An illustrative embodiment of such a joint is made by mounting a pin 11 more or less axially in one of the jointed member bones so that it projects into a cavity 12 at the end portion of the bone where the pin terminates in a socket element 13 having a pair of plate portions 14 which clamp a ball 15 fixed on the end of a pin 16 which extends from the member to which the bone is to be jointed. A screw 17 is provided for adjusting the clamping pressure in a well known manner so that the joint can be loosened, the parts moved, and the joint thereafter tightened.

The structure thus far described comprises a simulation of a complete or partial skeleton, in this case a human skeleton, which can be made of any size and in any degree of accuracy of detail, and which can be moved through various relationships, postures, etc.

The skeleton is provided at a multiplicity of points with elements of two-part fastening means for securing the muscles in place on it. These elements are preferably permanently mounted on the skeleton at the point where in the actual body the muscles are connected to the bones, and they may take any specific form which will cooperate for quick detachment and attachment of corresponding fastening means permanently fixed in the muscles. In the illustrated embodiment of the invention I have shown simple hooks and eyes, with the eyes embedded in the skeleton and the hooks embedded in the muscles. Thus, Figs. 2, 7, 8 and 9 show eyes 18 projecting from the bones for reception of hooks 19 projecting from the muscles. Figs. 10, 11 and 12 show an illustrative series of muscles provided with hooks 19.

The muscles are made of any suitable moldable composition, preferably a plastic which can be fashioned to appropriate shape and will thereafter set to permanent form and be flexible, elastic and resilient so as to simulate these properties of actual muscle tissue. It is possible to use various well known types of vulcanized rubber, both natural and synthetic, particularly the cellular type known as sponge rubber, which is compressible, resilient and flexible, and quite soft by reason of its internal porosity, but which has an external smooth surface simulating the surface of actual muscle tissue. I may also use the substance sold as a flexible mold material under the registered trade-mark "Duraflex" by St. Clair Rubber Company, of Marysville and Detroit, Michigan, or the material which Calresin Corporation, of 8564 Washington Boulevard, Culver City, California, describes as a solid thermoplastic resinous composition for forming flexible molds and sells under the trade-mark "Plastiflex."

With the hooks and eyes permanently embedded in the muscles and bones (in the specific arrangement shown in the drawings, or reversed, with the hooks embedded in the bones and the eyes in the muscles), preferably by fashioning the hook and eye material with counterhooked inner ends as shown in the drawings for making their anchorage secure, it is a very simple matter to apply any muscle or any set of muscles to proper location on the skeleton by connecting the hooks with the eyes, and to remove the muscles for inspection, handling, study, and re-application to the skeleton. Thus, for example, Fig. 3 shows a pectoral muscle 20 detached from the skeleton and reversed from its position in Fig. 1 where it is shown attached in place on the ribs of the trunk 6 and connected to the right upper arm 4, accurately because the hooks and eyes are correctly connected to each other. Fig. 10 shows at 21 a coraco-brachialis muscle. Fig. 11 shows a biceps 22, and Fig. 12 a brachialis-anticus 23, all in positions reversed from the positions which they occupy in Fig. 9 where they are shown mounted properly in place on the skeleton. It will be evident that they were mounted necessarily in a particular order or sequence, as may be noted by comparing Figs. 7, 8 and 9, and that with their several hooks 19 engaged with the proper eyes 18, they are all in correct position.

It will be evident also that if the bone members 4 and 5 to which the muscles 21, 22 and 23 are attached are moved relatively at the elbow joint, the muscles will flex, expanding or stretching and contracting in somewhat the manner of actual muscles, since they are connected to the bones at the same points as the actual muscles, on opposite sides of the joint, and since they are made of flexible, elastic material.

The structure proposed by the invention may of course be made in any size and according to any scale; it may completely represent the whole human or other animal body or it may be limited to some portion thereof. Its elements may simulate the actual body structure accurately in detail, with individual muscles and bones made separate to any extent desired, or a number of elements may be combined and made integral as a group, as may be desired or thought adequate for the particular purposes for which the device is to be used. Numerous details of the illustrative embodiment herein disclosed may be modified within the spirit of the invention as pointed out by the appended claims.

I claim:

1. An instruction device for representing the anatomy of a body comprising a skeleton made of individually rigid relatively thick members simulating the shapes of bones, means connecting certain of said members for relative movement, a plurality of relatively thick elements each simulating the shape of a muscle and made of resilient, flexible, elastic material, and two-part separable connecting means fixed respectively to the members and the elements for detachably securing certain of the elements to adjacent relatively movable members at points corresponding to the locations of the connections of the muscles to the bones in the body which the device represents, so that relative movement of said adjacent members will cause flexing of the elements connected thereto.

2. An instruction device for representing the anatomy of a body comprising a skeleton made of individually rigid relatively thick members simulating the shapes of bones, means articulating adjacent members for relative movement about joints interposed between said members, a plurality of relatively thick elements each simulating the shape of a muscle and made of resilient, flexible, elastic material, and two-part separable connecting means fixed respectively to the members and the elements for detachably securing certain of the elements to adjacent relatively movable members on opposite sides of a joint at points corresponding to the locations of the connections of the muscles to the bones in the body which the device represents, so that relative movement of said articulated members will cause flexing of the elements connected thereto.

HERMAN EMANUEL BRAEG.

REFERENCES CITED

The following references are of record in the file of this patent:

UNITED STATES PATENTS

| Number | Name | Date |
|---|---|---|
| 388,593 | Smith | Aug. 28, 1888 |
| 983,547 | Fleck | Feb. 7, 1911 |

OTHER REFERENCES

"Durolatex Models of Human Anatomy," catalogue of the Chicago Apparatus Co., Chicago, Ill.